United States Patent Office 2,758,956
Patented Aug. 14, 1956

2,758,956

TREATMENT OF HYDROCARBONS WITH PHOSPHORIC ACID AMIDES

Harold Shalit and Sol W. Weller, Drexel Hill, Pa., assignors to Houdry Process Corporation, Wilmington, Del., a corporation of Delaware No Drawing. Application October 31, 1952, Serial No. 318,074

10 Claims. (Cl. 196—14.35)

The present invention relates to treatment of hydrocarbon oils and is particularly concerned with processes involving contact of such oils with a special class of compounds having selective solvent action on components or impurities in the oil to effect their removal.

In accordance with the invention, the oil is contacted under suitable conditions, as will hereinafter appear, with an N-substituted amide of a phosphoric acid such as with an N-alkyl or N-aryl amide of ortho-, meta- or pyro-phosphoric acid. These compounds all contain the grouping

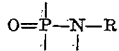

and can be characterized by the general formula

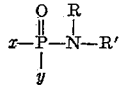

wherein R represents a hydrocarbon radical and R′ represents hydrogen or a hydrocarbon radical; $x$ is a substituent from the group consisting of OH and

and $y$ is a substituent from the group consisting of OH,

and a

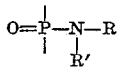

group attached to P of the general formula by an oxygen linkage; or $x$ and $y$ together are doubly bonded oxygen.

These phosphoric amide compounds have been found to have selective solvent action on impurities and/or components generally found in hydrocarbon oils, the particular nature of the compounds selectively dissolved by these phosphoric acid amides being determined largely by the polarity of the specific amide employed.

The described phosphoric acid amides find use in accordance with the invention in processes generally of treating hydrocarbon oils to separate or remove selectively substances therein having significantly higher polarity than the remainder of the oil. For instance by using such amides of sufficient polarity petroleum stocks can be effectively desalted and such stocks can be freed of or reduced in their content of sulfur compounds. Such polar amides likewise find use as solvents for removing oxygen and/or nitrogen compounds from hydrocarbon liquids or gases. Oils composed of mixtures of aromatic hydrocarbons with paraffins and/or naphthenes can be treated with these amides for selective separation of the aromatic components to form products of higher aromatic concentration.

The amides of orthophosphoric acid can be prepared by the general method described by D. F. Heath and P. Casapieri in Transactions of the Faraday Society (1951) volume 47, page 1093, involving reaction between a primary or secondary amine and phosphorus oxy chloride according to the following reaction mechanism:

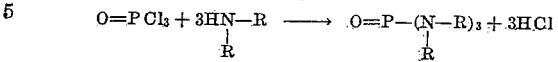

wherein at least one of the R substituents of the amine is alkyl or aryl and the other R substituent is alkyl, aryl, or hydrogen. By reducing the molecular quantity of amine employed only one or two of the halogen atoms of the phosphorus compound can be reacted, for example as represented by the following equation:

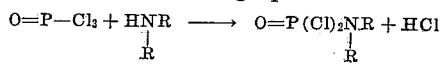

and the intermediate halogenated amide can be hydrolyzed, thus:

to furnish the mono-amide.

The amides of meta- and pyrophosphoric acid can be prepared in similar manner starting with the corresponding oxy halides of these phosphorus acids; viz.: metaphosphoryl chloride ($PO_2Cl$) and pyrophosphoryl chloride ($P_2O_3Cl_4$) respectively; or alternatively by the methods described by L. F. Audrieth, and A. D. F. Troy in Journ. A. C. S. (July 1942) vol. 64, pages 1553–4.

The solvent activity of these phosphoric acid amides can be modified by the degree of amidation of the acid or its anhydride, or by selection of the size of the aryl or alkyl substituents attached to the amido N; with increasing molecular weight of such hydrocarbon substituents the solvent action of the amide for less polar hydrocarbons is increased and/or its solvent effect on more polar substances may be decreased.

Among the phosphoric acid amido compounds that may be employed for extracting aromatic hydrocarbons from admixture with other non-aromatic hydrocarbons, as well as for the removal of more polar impurities from hydrocarbon fractions (such as salts; oxygen, nitrogen, or sulfur compounds), there are, for example:

1. $$O=P-[N(CH_3)_2]_3$$
(tri-dimethyl amide of orthophosphoric acid)

2. $$[(CH_3)_2N]_2-\overset{O}{\overset{\|}{P}}-O-\overset{O}{\overset{\|}{P}}-[N(CH_3)_2]_2$$
bis (bisdimethylamino)-phosphonous anhydride.
(G. Schrader: Brit. Intell. Obj. Subcom. Final Report 1095)

3. $$O=P(NHC_6H_{11})_3$$
tri N-cyclohexyl amide of orthophosphoric acid

4. $$O=P(NHCH_2.C_6H_5)_3$$
tri N-benzyl amide of orthophosphoric acid

Instead of the methyl substituted compounds in Examples 1 and 2 above corresponding homologues and analogues of these can be employed in which one or more of the methyl groups is replaced by hydrogen; or instead of methyl the compounds may have higher alkyl groups such as ethyl to hexyl attached to the nitrogen; or the compounds may contain aromatic or hydroaromatic N-substituents. Most of the compounds of this group are liquids of fairly high boiling point and are completely or at least partially miscible with water.

The solvent action of the phosphoric acid amides with respect to hydrocarbon compounds can be reduced and controlled, to obtain improved selectivity in extraction, by using these amides together with controlled amounts of water.

The extraction of aromatics from mixed hydrocarbon fractions may be utilized in various ways. For example, since in cracking or reforming of a hydrocarbon charge under usual conditions the aromatics pass through the reaction zone largely unchanged, and in fact, the conversion of the aromatics content of a mixed hydrocarbon charge is not ordinarily desired, by initially extracting the aromatics from the charge supplied to such conversion, considerable reduction is effected in the quantity of charge required to be handled in the conversion zone. The extracted aromatics provide a suitable product for use in motor fuel blending and for desired industrial uses, for instance as solvents and intermediates. Removal of aromatics may also be desired for the purpose of producing raffinates of higher paraffinicity for use in diesel and jet fuels.

Extraction of a portion of the aromatics from their admixture with non-aromatic hydrocarbons can be effected by the conventional procedures employed for liquid-liquid extraction, at room temperature or at any temperature in which the solvent and the oil to be treated are in liquid phase. With elevation of temperature the rate and extent of dissolution of the more soluble components is increased; however, at these higher temperatures there may be an accompanying removal of some of the less soluble substances present in the oil. The temperature of the operation as well as the proportions of solvent to oil will depend upon the degree of extraction desired, taking into consideration the particular composition of the oil and the solubility in the selected solvent of the substances desired to be extracted from the oil. In general, it is preferred to employ at least one volume of the phosphoric amide per volume of oil to be treated. If water is used, as to facilitate phase separation, it may be added to the solvent in amounts of about 5 to 50% by volume thereof.

The invention is not limited to treatment of oils in liquid state. Hydrocarbons can be treated in gas or vapor state, for instance by bubbling the same through a bath of the solvent.

Example I

A mixture of equal parts by volume of benzene and cyclohexane (52.5 weight percent benzene) was extracted at room temperature with an equal volume (or the mixture) of a solution containinig 80 volume percent of tri-dimethyl amide of orthophosphoric acid and 20% water. The liquid separated on short standing forming an aqueous extract layer and an oil raffinate layer, the latter comprising 60% by volume of the original oil. The extract was considerably enriched in benzene by the simple single stage extraction and contained approximately 67% by weight benzene. Benzene of greater purity is recovered from the extract by repeated extraction.

Example II

A fraction of a heavy East Texas catalytic cycle stock (boiling in the range 460° to Btms.) was extracted with the same aqueous mixture of the phosphoric acid amide used in the previous example, using six volumes of aqueous solvent solvent per five volumes of the oil. The raffinate yield was 92% by volume. The refractive index of the original cycle stock, which was $n_D^{20}=1.5120$, was reduced to $n_D^{20}=1.4907$ in the raffinate, representing material reduction in aromatics content of the stock and providing a more desirable charge for catalytic cracking.

In the same run the sulfur content of the stock was reduced from 0.432 to 0.236 weight percent S.

Example III

The same amide-water solution described in the preceding example was also used in extraction of a light East Texas virgin gas oil (boiling in the range 413–712° F.) obtaining a 95.5 volume percent yield of raffinate of considerably reduced aromatics content. The sulfur content of the oil was reduced 30% by this treatment.

Where the purpose of the treatment is principally that of removing sulfur and/or nitrogen compounds, amide solvents of higher polarity should be used, for instance those containing one or more free hydroxyl groups attached to the nitrogen, examples of which are mono- and di-(dimethyl) amides or orthophosphoric acid.

Removal not only of sulfur contaminants but also of nitrogen and oxygen contaminants from paraffinic and naphthenic hydrocarbon streams is readily accomplished with high yields of raffinate, since these hydrocarbons are considerably less soluble in the extracting solvent than are the contaminants.

Obviously many modifications and variations of the invention as hereinbefore set forth may be made without departing from the spirit and scope thereof, and therefore only such limitations should be imposed as are indicated in the appended claims.

What is claimed is:

1. The method which comprises the step of contacting a hydrocarbon oil mixture consisting only of normally liquid hydrocarbons in liquid state with a liquid characterized by a phosphoric acid amide to effect selective removal of more polar substances from said liquid hydrocarbon oil mixture, said phosphoric acid amide being one corresponding to the general formula:

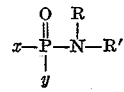

wherein R represents a hydrocarbon radical and R' represents a substituent selected from the group consisting of hydrogen and hydrocarbon radicals; and x and y are substituents selected from the group consisting of a single doubly-bonded oxygen, —OH radicals,

radicals, and not more than one

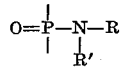

group attached to P of the general formula through an oxygen linkage.

2. The method which comprises the step of contacting a liquid hydrocarbon mixture containing aromatic and non-aromatic hydrocarbons with a liquid characterized by a phosphoric acid amide to obtain an extract richer in aromatic hydrocarbons than the resulting raffinate, said phosphoric acid amide being one corresponding to the general formula:

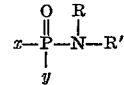

wherein R represents a hydrocarbon radical and R' represents a substituent selected from the group consisting of hydrogen and hydrocarbon radicals; and x and y are substituents selected from the group consisting of a single doubly-bonded oxygen, —OH radicals,

radicals, and not more than one

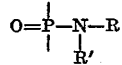

group attached to P of the general formula through an oxygen linkage.

3. The method of beneficiating a hydrocarbon mixture consisting only of normally liquid hydrocarbons in the liquid state which comprises extracting such an oil in liquid state with an aqueous solution of an N-hydrocarbon substituted amide of orthophosphoric acid in the presence of 5 to 50% water by volume of the amide.

4. The method of claim 3 which comprises extracting a hydrocarbon oil in liquid state with tri-dimethyl amide of orthophosphoric acid.

5. The method of conducting a liquid-liquid extraction for the formation of an extract and a raffinate which method comprises the contacting of a liquid hydrocarbon mixture consisting only of normally liquid materials with an aqueous solution of an N-hydrocarbon substituted amide of orthophosphoric acid, said solution containing 5 to 50% water by volume of the amide, the extract obtained by said extraction being richer in more polar liquids from said hydrocarbon mixture than the resulting raffinate, said phosphoric acid amide being one corresponding to the general formula:

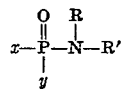

wherein R represents a hydrocarbon radical and R' represents a substituent selected from the group consisting of hydrogen and hydrocarbon radicals; and $x$ and $y$ are substituents selected from the group consisting of a single doubly-bonded oxygen, —OH radicals,

radicals, and not more than one

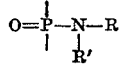

group attached to P of the general formula through an oxygen linkage.

6. The method of claim 5 which comprises extracting a hydrocarbon oil with monodimethyl amide of orthophosphoric acid.

7. The method of claim 5 which comprises extracting a hydrocarbon oil with the tetradimethylamide of pyrophosphoric acid.

8. The method of claim 5 which comprises extracting a hydrocarbon oil with an N-cyclohexyl amide of a phosphoric acid.

9. The method of claim 5 which comprises extracting a hydrocarbon oil with an N-benzyl amide of orthophosphoric acid.

10. The method of claim 5 for desulfurizing hydrocarbon oil which comprises contacting such an oil with an aqueous liquid comprising an N-hydrocarbon substituted amide of a phosphoric acid, said amide containing at least one hydroxyl group attached to the amide nitrogen.

References Cited in the file of this patent
UNITED STATES PATENTS

| | | |
|---|---|---|
| 2,166,140 | Hansley | July 18, 1939 |
| 2,183,852 | Boyd | Dec. 19, 1939 |
| 2,225,910 | Gurd et al. | Dec. 24, 1940 |
| 2,385,981 | Friedman | Oct. 2, 1945 |
| 2,502,966 | Kosolapoff | Apr. 4, 1950 |
| 2,623,611 | Levine et al. | Dec. 30, 1952 |